United States Patent
Lee (10) Patent No.: US 7,957,737 B2
(45) Date of Patent: Jun. 7, 2011

(54) MESH NODE ASSOCIATION METHOD IN A MESH NETWORK, AND MESH NETWORK SUPPORTING THE SAME

(75) Inventor: In-Sun Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 866 days.

(21) Appl. No.: 11/446,350

(22) Filed: Jun. 2, 2006

(65) Prior Publication Data

US 2007/0011435 A1 Jan. 11, 2007

Related U.S. Application Data

(60) Provisional application No. 60/686,598, filed on Jun. 2, 2005.

(30) Foreign Application Priority Data

Jun. 2, 2006 (KR) .................. 10-2006-0049851

(51) Int. Cl.
*H04W 4/00* (2009.01)

(52) U.S. Cl. .................. 455/435.1; 455/41.2; 455/41.3; 455/410; 455/411; 455/432.1; 455/436; 455/446; 370/331; 370/332; 370/333; 370/334; 370/338

(58) Field of Classification Search .................. 455/41.2, 455/41.3, 410–411, 432.1, 435.1, 436, 446; 370/331–334, 338
See application file for complete search history.

(56) References Cited

U.S. PATENT DOCUMENTS

| | | | | |
|---|---|---|---|---|
| 4,670,899 A * | 6/1987 | Brody et al. | .................. | 455/453 |
| 5,796,722 A * | 8/1998 | Kotzin et al. | .................. | 370/252 |
| 6,192,249 B1 * | 2/2001 | Padovani | .................. | 455/453 |
| 6,618,584 B1 * | 9/2003 | Carneheim et al. | .................. | 455/411 |
| 7,215,926 B2 * | 5/2007 | Corbett et al. | .................. | 455/41.2 |
| 7,295,544 B2 * | 11/2007 | Allen et al. | .................. | 370/338 |
| 7,346,772 B2 * | 3/2008 | Rebo et al. | .................. | 713/155 |
| 7,366,113 B1 * | 4/2008 | Chandra et al. | .................. | 370/255 |
| 7,502,354 B1 * | 3/2009 | Maufer | .................. | 370/338 |
| 7,649,872 B2 * | 1/2010 | Naghian et al. | .................. | 370/338 |
| 2005/0208945 A1 * | 9/2005 | Hong et al. | .................. | 455/436 |
| 2006/0140123 A1 * | 6/2006 | Conner et al. | .................. | 370/238 |
| 2006/0291482 A1 * | 12/2006 | Evans | .................. | 370/401 |
| 2007/0110092 A1 * | 5/2007 | Kangude et al. | .................. | 370/448 |
| 2007/0189249 A1 * | 8/2007 | Gurevich et al. | .................. | 370/338 |
| 2007/0248044 A1 * | 10/2007 | Vogety et al. | .................. | 370/329 |

* cited by examiner

*Primary Examiner* — Stephen M D'Agosta
(74) *Attorney, Agent, or Firm* — NSIP Law (57) ABSTRACT

A mesh network has a plurality of mesh nodes, including a moving mesh node. A serving mesh node initially associates with the moving mesh node at the request of the moving mesh node, transmits context information due to the initial association to at least one neighbor mesh node, and transmits information on the at least one neighbor mesh node to the moving mesh node. The at least one neighbor mesh node stores the context information received from the serving mesh node, and re-associates with the moving mesh node using the context information at the request of the moving mesh node.

31 Claims, 6 Drawing Sheets

MESH NODE ASSOCIATION METHOD IN A MESH NETWORK, AND MESH NETWORK SUPPORTING THE SAME

This application claims the benefit provisional application entitled "Mesh Node Association Method in a Mesh Network, and Mesh Network Supporting the Same" U.S. Provisional Application No. 60/686,598 filed on Jun. 2, 2005, Korean Patent Application No. 2006-49851 filed in the Korean Intellectual Property Office on Jun. 2, 2006, the entire contents of which are incorporated herein by reference.

BACKGROUND OF THE INVENTION

1. Field of the Invention

The present invention relates generally to a mesh network having a plurality of mesh nodes, and in particular, to a re-association method in a mesh network in which mobility of mesh nodes is considered.

2. Description of the Related Art

Currently, mobile communication technology is being developed to maximize data rate and frequency efficiency in order to provide multimedia service. A mobile access network is a typical example of the advanced mobile communication technology. Mobile access network refers to the network that provides high-speed wireless service to terminals in its service coverage area.

The latest mobile access network is a set of local networks having access points (APs) and legacy stations. The legacy station is provided with its desired wireless service through association with the AP.

Current mobile access network is evolving into mesh networks which can be extended through association with multiple local networks. The mesh network is composed of a plurality of mesh nodes. The mesh node is also known as a mesh point (MP). The MP can serve as an AP in the local network, and can also directly exchange information through association with neighbor APs.

In a mesh network, there is a common need for an association procedure and an authentication procedure in order for an MP to serve as a supporting element of the mesh network. The association procedure includes a process in which the MP attempts association with a particular MP constituting the mesh network, and another process in which the particular MP grants the attempt. The authentication procedure includes a process of performing authentication on the MP in the mesh network at the request of the MP. Therefore, in the existing mesh network, there is a time requirement for both the association procedure and the authentication procedure in order to add a new MP as a supporting element.

Meanwhile, the MP can both leave the existing mesh network and associate with another mesh network, as well as re-associate with another MP in the same mesh network. This is because the MP can be a terminal having mobility. Therefore, in the conventional mesh network, the association procedure and the authentication procedure are performed in the same manner regardless of an initial association request and a re-association request.

As described above, in the conventional mesh network, a mesh node repeatedly performs the authentication procedure in the process of performing re-association with another mesh node, causing an unnecessary delay. The delay can both significantly affect quality-of-service (QoS), as well as disable fast roaming in the mesh network.

SUMMARY OF THE INVENTION

It is, therefore, an object of the present invention to provide a mesh node association method in which mobility of mesh nodes is considered in a mesh network, and a mesh network supporting the same.

It is another object of the present invention to provide a mesh node association method for minimizing a time required for re-association of a mesh node in a mesh network, and a mesh network supporting the same.

It is further another object of the present invention to provide a mesh node association method in which a mesh node constituting a mesh network, if a new mesh node associates therewith, delivers context information for the association to at least one neighbor mesh node, and a mesh network supporting the same.

It is yet another object of the present invention to provide a mesh node association method for performing a re-association procedure with a moving mesh node based on previously delivered context information in response to a re-association request from the moving mesh node in a mesh network, and a mesh network supporting the same.

According to one aspect of the present invention, there is provided a mesh node association method in a mesh network having a plurality of mesh nodes. The method includes associating a new mesh node to a particular mesh node among the plurality of mesh nodes; and delivering context information generated by the association of the new mesh node from the particular mesh node to at least one neighbor mesh node.

According to another aspect of the present invention, there is provided a method for associating with a neighbor mesh node by a particular mesh node among a plurality of mesh nodes in a mesh network including the plurality of mesh nodes. The method includes performing initial association with a serving mesh node among the plurality of mesh nodes; receiving a neighbor list from the serving mesh node; determining a target mesh node from at least one neighbor mesh node acquired based on the neighbor list; and performing re-association with the target mesh node. The re-association between the particular mesh node and the target mesh node is performed based on context information generated by the initial association, and the generated context information is previously delivered to the at least one neighbor mesh node by the serving mesh node.

According to further another aspect of the present invention, there is provided a method for associating with a new mesh node by a particular mesh node among a plurality of mesh nodes in a mesh network having the plurality of mesh nodes. The method includes performing initial association with the new mesh node at the request of the new mesh node; sending transmitting a neighbor list to the new mesh node for which the initial association is performed; and delivering context information generated by the initial association to at least one neighbor mesh node determined based on the neighbor list. Information on the at least one neighbor mesh node is written in the neighbor list, and the context information includes information necessary for authentication of the new mesh node.

According to yet another aspect of the present invention, there is provided a method for associating with a moving mesh node from a neighbor mesh node by a particular mesh node among a plurality of mesh nodes in a mesh network including the plurality of mesh nodes. The method includes receiving context information for the moving mesh node from the neighbor mesh node; storing the received context information; and performing association with the moving mesh node using the context information at the request of the moving mesh node.

According to still another aspect of the present invention, there is provided a mesh network including a plurality of mesh nodes. The network includes a moving mesh node; a serving mesh node for initially associating with the moving mesh node at the request of the moving mesh node, transmitting context information due to the initial association to at least one neighbor mesh node, and transmitting information on the at least one neighbor mesh node to the moving mesh node; and the at least one neighbor mesh node for storing the context information received from the transmitting mesh node, and re-associating with the moving mesh node using the context information at the request of the moving mesh node.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a process for enabling a Serving MP and at least one neighbor MP to cooperatively share context information for a particular MP with each other, such that fast re-association can be achieved even while the particular MP moves in a mesh network. In order to enable the Serving MP and the neighbor MP to share the context information for the particular MP, the overall signaling procedure in the mesh network should be described. In addition, both operations not only in the particular MP and the Serving MP as well as in the neighbor MP should be described.

The provided process will be described in detail herein below with reference to the accompanying drawings.

Figure 1:
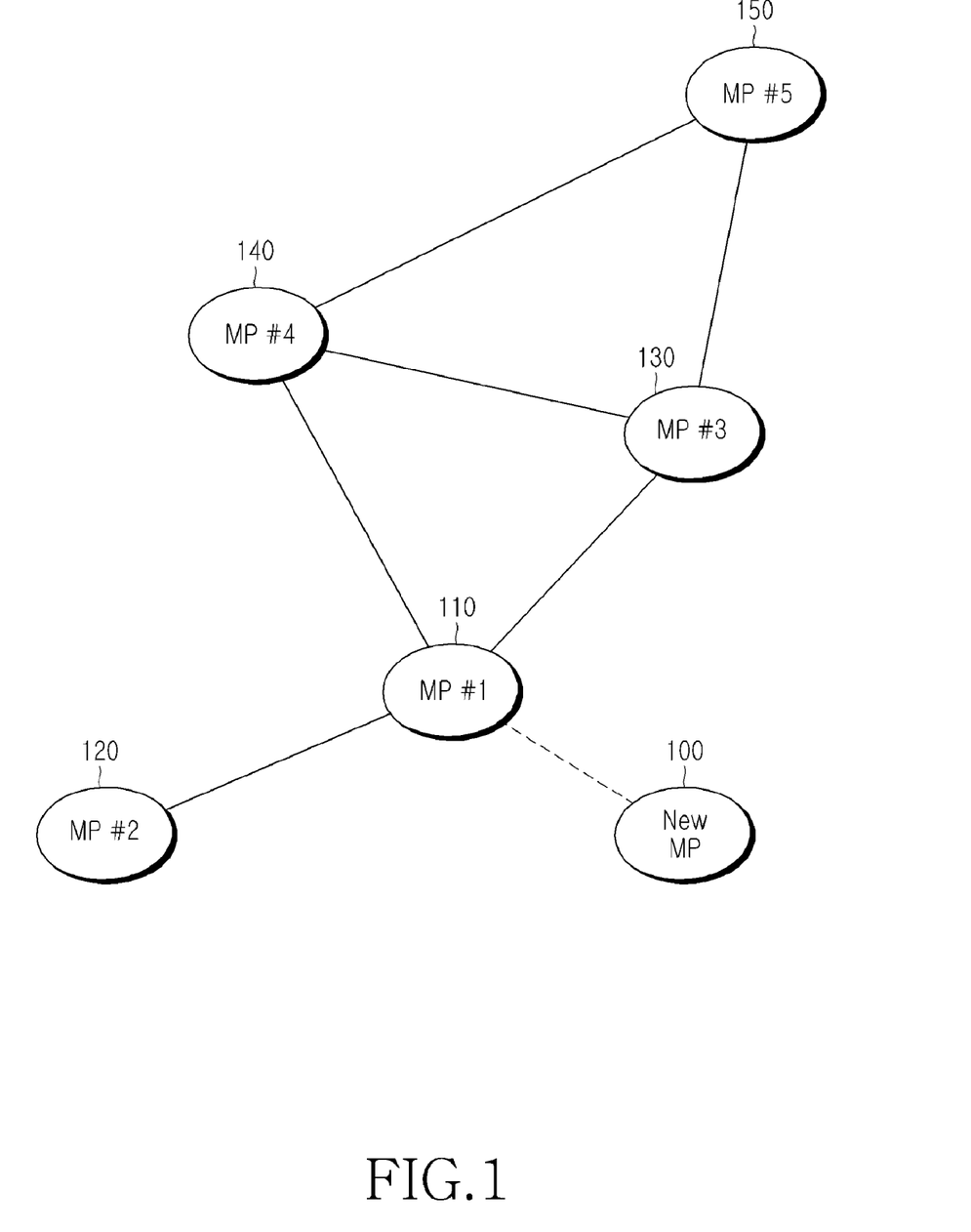
FIG. 1 is a diagram illustrating an preferred mesh network for a description of an operating scenario according to the present invention.

FIG. 1 is a diagram illustrating an preferred mesh network for a description of an operating scenario according to the present invention. It is assumed in FIG. 1 that a New MP attempts association with a mesh network through an MP#1 in the mesh network having five MPs MP#1 to MP#5. In FIG. 1, the MPs connected with solid lines represent previously associated MPs. That is, the MPs connected with solid lines are neighbor MPs for each other.

Referring to FIG. 1, a New MP 100, i.e., a moving MP, performs an initial association procedure to an MP#1 110 in order to access the mesh network. If authentication for the New MP 100 is achieved by the initial association procedure, the MP#1 110 creates context information for the New MP 100 with at least one neighbor MP. The created context information is managed by the MP#1 110, for the New MP 100. The MP#1 110 delivers the context information to at least one neighbor MP associated therewith. In association with FIG. 1, neighbor MPs of the MP#1 110 include an MP #2 120, an MP #3 130 and an MP #4 140.

The MP#2 120, MP #3 130 and MP #4 140 receive the context information delivered from the MP#1 110. The MP#2 120, MP #3 130 and MP #4 140 store therein the received context information in association with the New MP 100. The context information is the information necessary for authentication of the corresponding MP. In addition, information on a valid time can be added to the context information. The valid time represents the time at which validity of the corresponding context information is permitted. Therefore, MP#1 110 as well as the MP#2 120, MP #3 130 and MP #4 140 can discard the corresponding context information upon expiration of the valid time.

The reason for delivering the context information only to the neighbor MPs as stated above is because there is a high probability that the corresponding moving MP will move to the neighbor MPs. It would be obvious to those skilled in the art that the context information can be created to include information on an MP spaced more than 1 hop, when necessary.

The MP#1 110 manages information on its neighbor MPs through a neighbor list. This is commonly applied to all MPs constituting the mesh network. The MP#1 110 sends its neighbor list to the New MP 100 that newly attempts association.

The New MP 100 receives the neighbor list from the MP#1 110. Based on the neighbor list, the New MP 100 determines at least one neighbor MP to which it can move. If the New MP 100 needs a request for re-association due to its moving, it selects at least one of the determined neighbor MPs as a Target MP. Thereafter, the New MP 100 transmits a re-association request to the selected Target MP. In FIG. 1, the MP#2 120 and the MP#3 130 have the highest probability that they will receive the re-association request from the New MP 100.

The neighbor MP, upon receipt of the re-association request from the New MP 100, performs re-association with the New MP 100. The re-association with the New MP 100 is performed using the context information delivered by the MP#1 110 and stored in the corresponding neighbor MP. Therefore, the neighbor MP can omit the authentication procedure for the New MP 100, decreasing the time required for the re-association.

Figure 2:
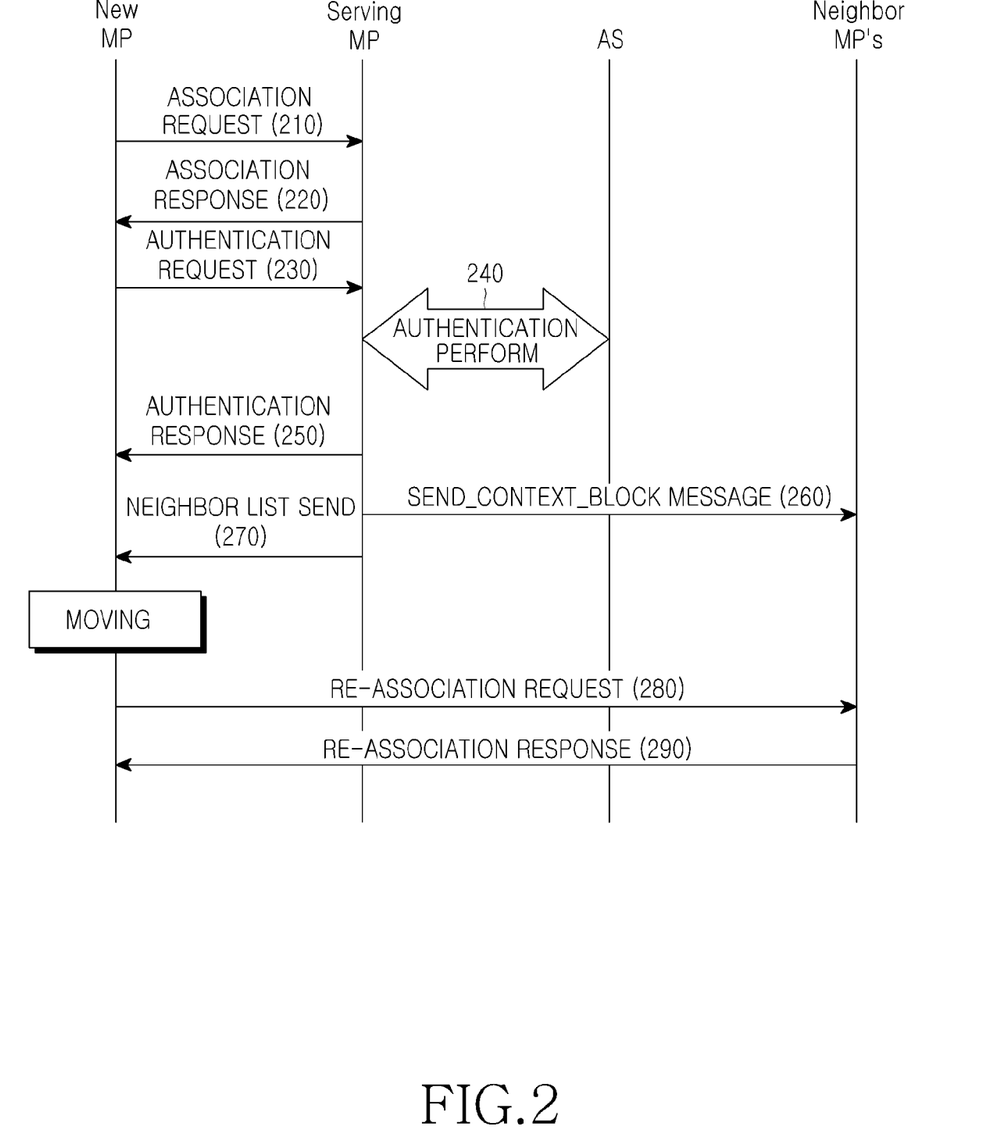
FIG. 2 is a diagram illustrating a signaling procedure in a mesh network according tithe present invention.

FIG. 2 is a diagram illustrating a signaling procedure in a mesh network according to the present invention. The signaling procedure shown in FIG. 2 can be divided into a signaling procedure for initial association, a signaling procedure for authentication, and a signaling procedure for re-association. The signaling procedure for initial association is achieved between a New MP and a Serving MP, and represented by reference numerals 210 and 220. The signaling procedure for authentication is performed between the New MP and the Serving MP, between the Serving MP and an Authentication Server (AS), and between the Serving MP and a Target MP, and is represented by reference numerals 230 to 270. The Target MP corresponds to the MP to which the New MP will move, among the neighbor MPs of the Serving MP. The signaling procedure for re-association is achieved between the New MP and the Target MP, and represented by reference numerals 280 and 290.

Referring to FIG. 2, for initial association with the mesh network, the New MP determines one of the MPs constituting the mesh network as a Serving MP. The New MP transmits an Association Request message for requesting association to the Serving MP in step 210. The Serving MP transmits an Association Response message for permitting the association to the New MP in response to the Association Request message in step 220.

Thereafter, the New MP transmits an Authentication Request message for requesting authentication to the Serving MP in step 230. The Serving MP, upon receipt of the Authentication Request message, performs an authentication procedure for the New MP in step 240. The authentication procedure is performed between the Serving MP and the AS. If the authentication for the New MP is completed, the Serving MP transmits an Authentication Response message to the New MP in response to the Authentication Request message in step 250. Upon receipt of the Authentication Response message from the Serving MP, the New MP ends the authentication procedure. The Serving MP stores the authentication information for the New MP as context information.

The above-described initial association procedure is achieved based on centralized-initial authentication. Alternatively, the initial association procedure can also be performed based on distributed-initial authentication.

If the initial association and authentication procedures with/for the New MP are completed, the Serving MP transmits the previously stored context information to at least one neighbor MP along with a Send_Context_Block message in step 260. The context information includes authentication information for the New MP. In addition, the context information can include information on a valid time of the authentication information.

The neighbor MP means an MP to which the New MP can directly move from the Serving MP, without passing through another MP. Each MP constituting the mesh network searches for its neighbor MPs and periodically updates the neighbor MP information. The MP manages the neighbor MP information using a neighbor list. Further, the MP periodically transmits its neighbor list to a moving MP that newly attempts association or attempts re-association. Based on the neighbor list, the moving MP can determine an MP with which it will associate or re-associate.

Therefore, the Serving MP transmits a neighbor list having information on at least one neighbor MP whose context information is cached by the Serving MP itself, to the New MP in step 270. Based on the received neighbor list, the New MP can determine a neighbor MP to which it will probably move. The New MP stores information on the neighbor MP determined through the neighbor list, preparing for its movement to the neighbor MP.

The New MP monitors whether there is a need for re-association with another MP due to its movement. The New MP can be referred to as a moving MP, when there is a need for the re-association. If there is a need for the re-association, the moving MP determines a Target MP with which it will re-associate, based on the previously stored neighbor MP information. The moving MP transmits a Re-Association Request message for requesting re-association to the determined Target MP in step 280.

The Target MP, upon receipt of the Re-Association Request message, performs re-association and authentication operations on the moving MP using the context information previously provided from the Serving MP. As described above, the context information includes therein authentication information for the corresponding MP. Therefore, the Target MP can omit the authentication procedure with the AS. The Target MP sends a Re-Association Response message to the moving MP in response to the Re-Association Request message in step 290.

The moving MP receives the Re-Association Response message from the neighbor MP, completing successful re-association with the Target MP.

The Target MP updates the old authentication information after the re-association with the moving MP. The Target MP newly creates context information using the updated authentication information, and delivers the created context information to at least one neighbor MP that the Target MP is managing through the neighbor list. In addition, the Target MP provides its neighbor list to the re-associated moving MP, preparing for re-association due to another movement.

Figure 3:
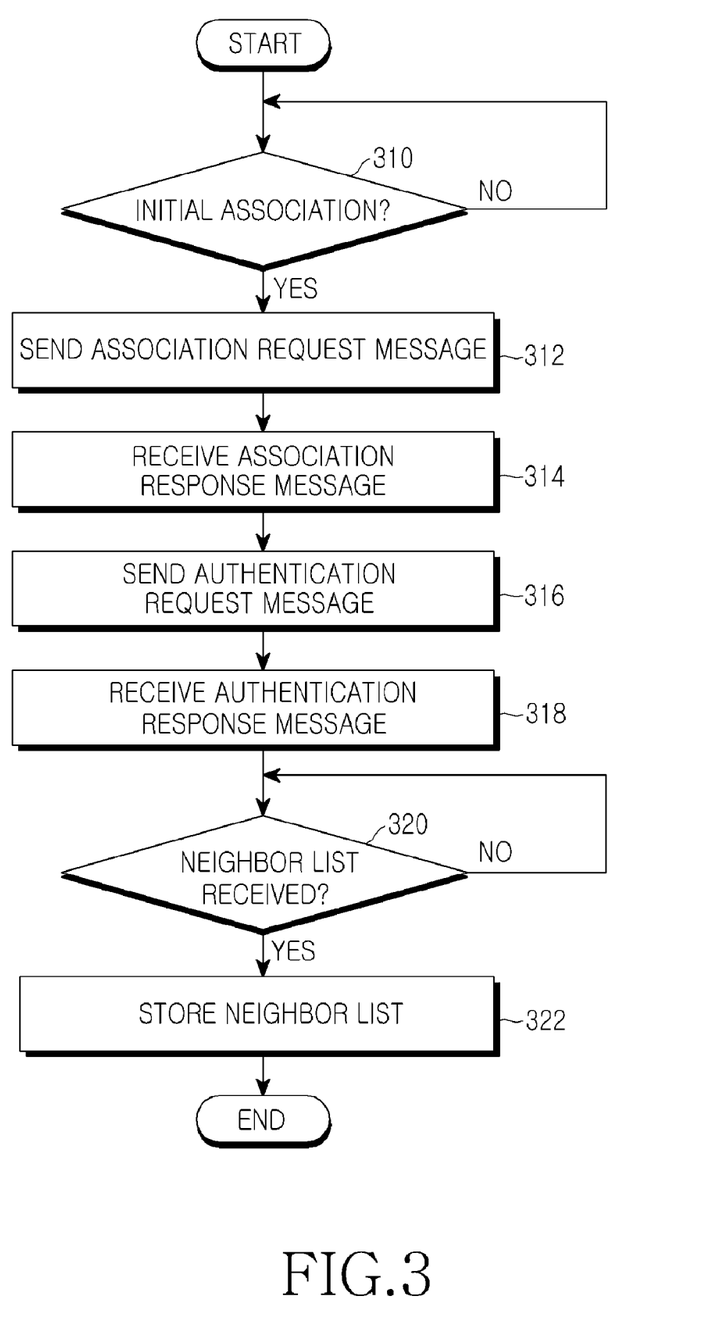
FIG. 3 is a flowchart illustrating a control flow performed in a New MP to initially associate with a mesh network according to the present invention.

FIG. 3 is a flowchart illustrating a control flow performed in a New MP to initially associate with a mesh network according to the present invention. Referring to FIG. 3, an MP determines in step 310 whether there is a need for initial association with the mesh network possibly due to its movement. If it is determined that there is a need for initial association with a particular mesh network, the MP transmits an Association Request message in step 312. The Association Request message is received at a particular MP (Serving MP) constituting the mesh network with which the MP desires to associate. The serving MP transmits an Association Response message in response to the received Association Request message.

The MP receives the Association Response message transmitted by the Serving MP in step 314. Upon receipt of the Association Response message, the MP transmitted an Authentication Request message to the Serving MP in step 316. The Serving MP, upon receipt of the Authentication Request message, performs an authentication procedure for the MP. The authentication procedure is performed through a procedure previously agreed with an authentication server. If the authentication procedure for the MP is completed, the Serving MP transmits an Authentication Response message in response to the Authentication Request message.

The MP receives the Authentication Response message from the Serving MP in step 318. Upon receipt of the Authentication Response message, the MP recognizes that association with the corresponding network is finally permitted.

After the association with the mesh network is completed, the MP checks in step 320 whether a neighbor list is received from the Serving MP. The neighbor list includes information on at least one neighbor MP associated with the Serving MP. In addition, the neighbor list can include information on a valid time of the information on the at least one neighbor MP. The MP stores the received neighbor list in step 322.

Figure 4:
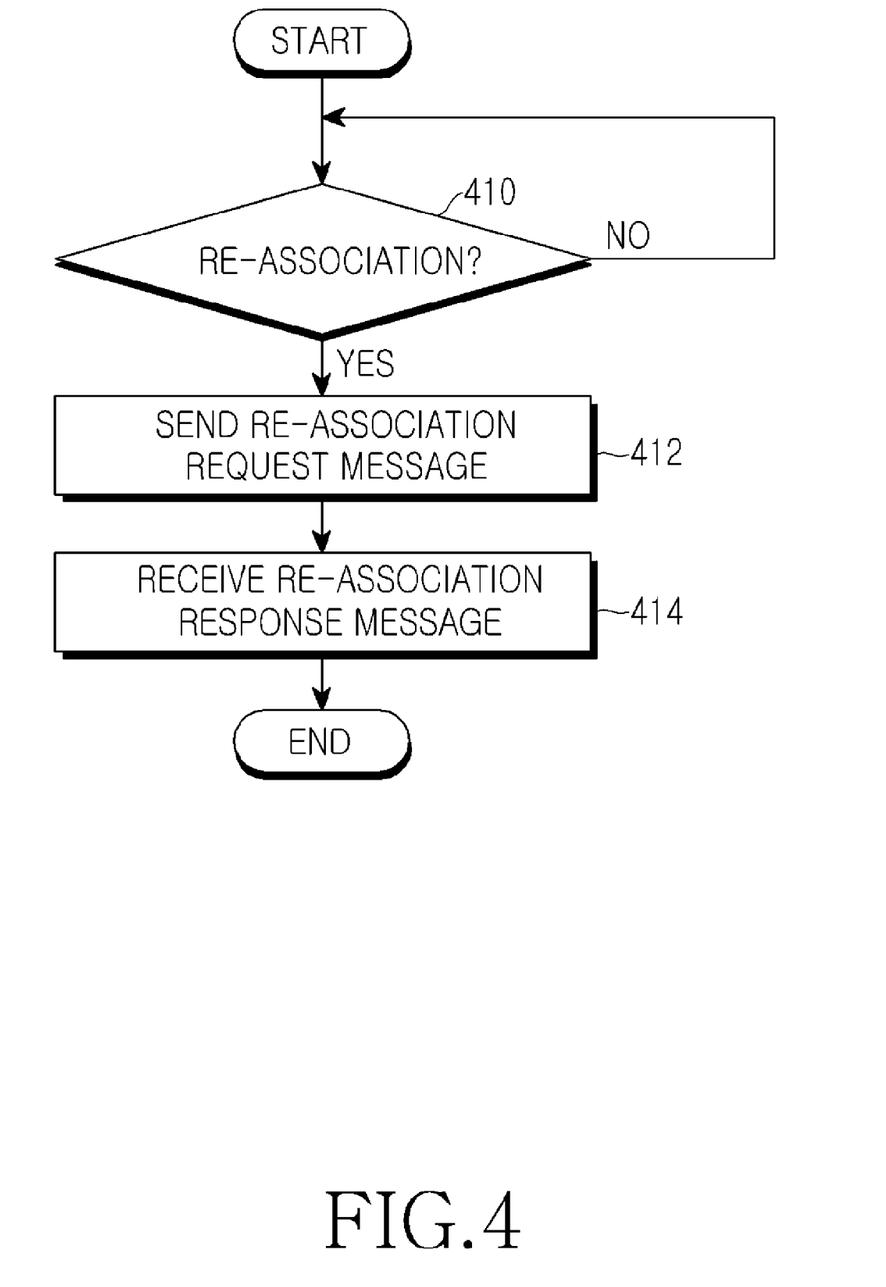
FIG. 4 is a flowchart illustrating a control flow performed by a moving MP for re-association in a mesh network according to the present invention.

FIG. 4 is a flowchart illustrating a control flow performed by a moving MP for re-association in a mesh network according to the present invention. Referring to FIG. 4, a moving MP determines in step 410 whether there is a need for re-association. The need for re-association arises when the moving MP moves from its old Serving MP to another MP. If there is a need for re-association, the moving MP transmits a Re-Association Request message in step 412. A target MP for the Re-Association Request message can be determined depending on a neighbor list previously provided from the old Serving MP. That is, the moving MP determines a target MP from at least one neighbor MP determined based on the previously provided neighbor list. In a preferred method for determining the target MP, the moving MP can measure strength of a signal received from at least one neighbor MP, and determine a neighbor MP having the highest measured signal strength as a target MP.

Upon receipt of the Re-Association Request message from the moving MP, the target MP determines whether to perform re-association for the moving MP. In this case, the target MP performs authentication for the moving MP. For the authentication, the target MP uses the known context information for the moving MP. The context information is previously provided from the old Serving MP with which the moving MP was previously associated. If the authentication for the moving MP is completed, the target MP transmits a Re-Association Response message in response to the Re-Association Request message.

The moving MP receives the Re-Association Response message from the target MP in response to the Re-Association Request message in step 414, completing successful re-association with the target MP.

Figure 5:
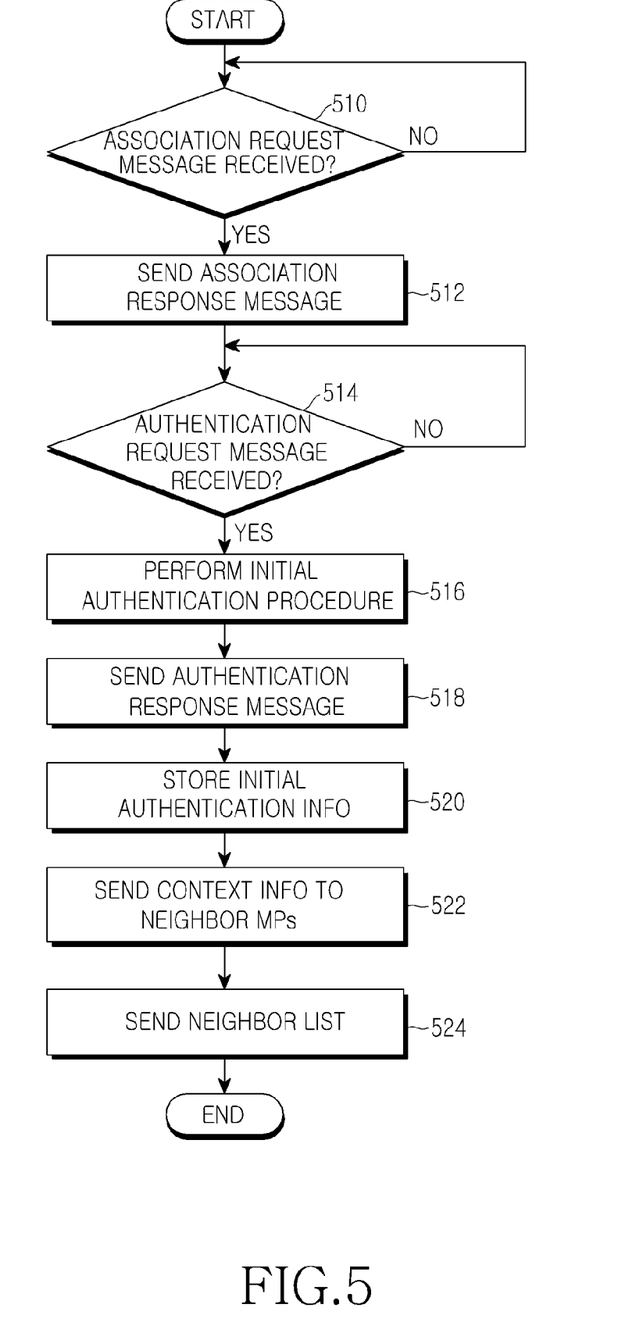
FIG. 5 is a flowchart illustrating a control flow performed in a Serving MP for initial association in a mesh network according to the present invention.

FIG. 5 is a flowchart illustrating a control flow performed in a Serving MP for initial association in a mesh network according to present invention. Referring to FIG. 5, a Serving MP monitors in step 510 whether an Association Request message is received. The Association Request message is transmitted from a New MP that wants to newly associate with a mesh network. Upon receipt of the Association Request message, the Serving MP transmitted an Association Response message in response to the Association Request message in step 512. The Association Response message is transmitted to the New MP.

The Serving MP monitors in step 514 whether an Authentication Request message is received. The Authentication Request message is transmitted by the New MP that received the Association Response message. Upon receipt of the Authentication Request message, the Serving MP performs an authentication procedure with an AS in step 516. Authentication for the New MN is achieved by the authentication procedure. If the authentication for the New MP is achieved, the Serving MP sends an Authentication Response message to the New MP in response to the Authentication Request message in step 518.

The Serving MP stores initial authentication information acquired by the authentication procedure for the New MP in a cache in step 520. The Serving MP creates context information for the New MP based on the stored initial authentication information. The Serving MP transmits the created context information to at least one neighbor MP in step 522. Therefore, the at least one neighbor MP, upon receipt of a re-association request from a corresponding MP, can simplify the authentication procedure caused by the re-association of the corresponding MP based on the context information.

In addition, the Serving MP manages information on the at least one neighbor MP based on the neighbor list. The Serving MP transmits the neighbor list to the New MP in step 524. Therefore, the New MP, if there is a need for re-association due to its movement, can determine a target MP with which it will associate, based on the neighbor list.

Figure 6:
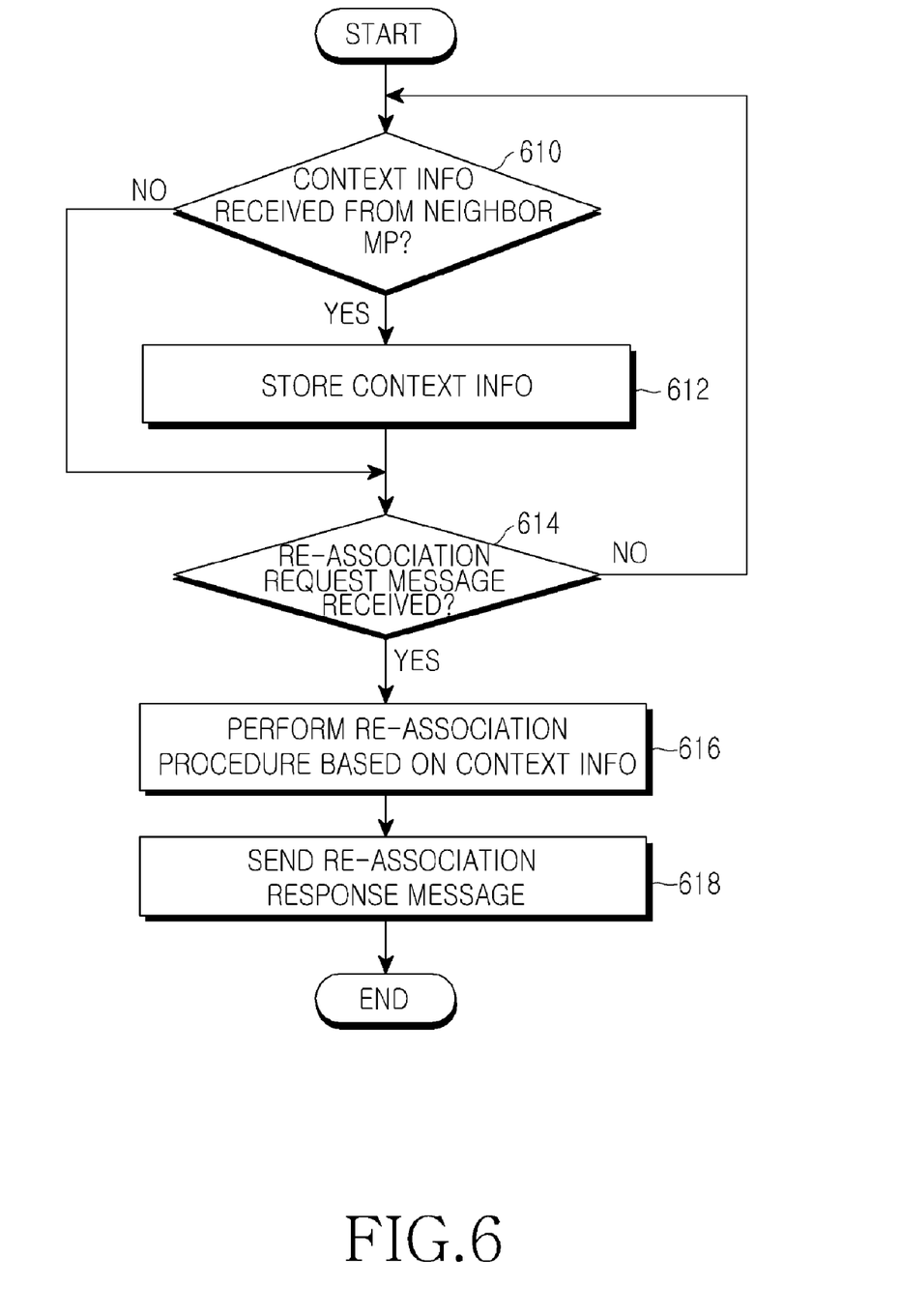
FIG. 6 is a flowchart illustrating a control flow performed in a target MP for re-association in a mesh network according to the present invention.

FIG. 6 is a flowchart illustrating a control flow performed in a target MP for re-association in a mesh network according to the present invention.

Referring to FIG. 6, a target MP monitors, in step 610, whether context information for a particular MP is received from a neighbor MP. If the context information for the particular MP is received, the target MP stores the received context information in a cache in step 612. The context information includes authentication information for the particular MP. In addition, the context information can include information on a valid time of the authentication information. The target MP can delete the corresponding context information from the cache, if a Re-Association Request message is not received from the particular MP until the valid time expires.

The target MP monitors in step 614 whether a Re-Association Request message is received from the particular MP, i.e., a moving MP. Upon receipt of the Re-Association Request message, the target MP performs a re-association procedure based on previously known context information in step 616. The re-association procedure includes a procedure for performing authentication for the moving MP based on the context information.

If the re-association for the moving MP is completed, the target MP transmits sends a Re-Association Response message to the moving MP in step 618.

Although not illustrated in FIG. 6, if the re-association for the moving MP is completed, the target MP updates context information for the moving MP based on the re-association. The target MP delivers the updated context information to at least one neighbor MP. Thereafter, the target MP provides a neighbor list that manages information on the at least one neighbor MP, to the moving MP. This is to simplify the re-association procedure which may further occur in the future.

As can be understood from the foregoing description, the present invention can reduce a re-association delay by simplifying the re-association procedure due to movement of an MP in the mesh network, enabling rapid communication resumption due to the movement. In addition, the present invention can provide both stable QoS as well as fast roaming service in the mesh network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mesh node association method by a mesh node in a mesh network, the mesh network comprising a plurality of mesh nodes, the method comprising:

associating a new mesh node to a particular mesh node among the plurality of mesh nodes;

authenticating the new mesh node by performing, by the particular mesh node, an authentication procedure for the new mesh node;

generating context information comprising authentication information of the new mesh node; and delivering the context information to at least one neighbor mesh node included in a neighbor list;

wherein the delivering of the context information is performed after the generating of the context information and before the new mesh node requests re-association with any of the at least one neighbor mesh node;

the neighbor list is a neighbor list of the particular mesh node; and the authentication information of the new mesh node is generated during the authenticating of the new mesh node in the authentication procedure performed by the particular mesh node, and enables the at least one neighbor mesh node to authenticate the new mesh node without performing the authentication procedure performed by the particular mesh node in authenticating the new mesh node.

2. The mesh node association method of claim 1, wherein the new mesh node is a moving node.

3. The mesh node association method of claim 2, wherein the at least one neighbor mesh node is a mesh node to which the new mesh node can directly move from the particular mesh node, without passing through another mesh node.

4. The mesh node association method of claim 3, wherein each of the plurality of mesh nodes manages at least one neighbor mesh node based on the neighbor list.

5. The mesh node association method of claim 4, further comprising transmitting the neighbor list from the particular mesh node to the new mesh node.

6. The mesh node association method of claim 1, wherein the associating of the new mesh node comprises:
transmitting, by the new mesh node, an association request message; and
transmitting, by the particular mesh node, an association response message in response to the association request message; and
the authenticating of the new mesh node comprises:
transmitting, by the new mesh node, an authentication request message in response to the association response message;
performing, by the particular mesh node, the authentication procedure for the new mesh node with an authentication server in response to the authentication request message to generate the authentication information of the new mesh node;
transmitting, by the particular mesh node, an authentication response message to the new mesh node after completion of the authentication procedure; and
storing, by the particular mesh node, the authentication information of the new mesh node.

7. The mesh node association method of claim 6, further comprising receiving, by the at least one neighbor mesh node, context information transmitted by the particular mesh node and storing the received context information.

8. The mesh node association method of claim 7, wherein the context information further comprises information on a valid time of the authentication information.

9. The mesh node association method of claim 8, further comprising, if the valid time expires, discarding, by the particular mesh node and the at least one neighbor mesh node, corresponding context information.

10. The mesh node association method of claim 1, wherein the authenticating of the new mesh node is performed by the particular mesh node after the associating of the new mesh node and before the generating of the context information; and
the generating of the context information is performed by the particular mesh node after the authenticating of the new mesh node and before the delivering of the context information.

11. A method for associating with a neighbor mesh node by a particular mesh node among a plurality of mesh nodes in a mesh network, the mesh network comprising the plurality of mesh nodes, the method comprising:
performing initial association with a serving mesh node among the plurality of mesh nodes;
receiving a neighbor list from the serving mesh node;
determining a target mesh node from at least one neighbor mesh node based on the neighbor list; and
performing re-association with the target mesh node;
wherein the re-association between the particular mesh node and the target mesh node is performed based on context information;
the serving mesh node authenticates the particular mesh node by performing an authentication procedure after the performing of the initial association with the serving mesh node;
the receiving of the neighbor list is performed after the serving mesh node authenticates the particular mesh node;
the serving mesh node generates the context information after the serving mesh node authenticates the particular mesh node and before the receiving of the neighbor list is performed;
the context information comprises authentication information of the particular mesh node;
the context information is delivered to the at least one neighbor mesh node before the determining of a target mesh node is performed;
the neighbor list is a neighbor list of the serving mesh node; and
the authentication information of the particular mesh node is generated during the authenticating of the particular mesh node in the authentication procedure performed by the serving mesh node, and enables the target mesh node to authenticate the particular mesh node without performing the authentication procedure performed by the serving mesh node in authenticating the particular mesh node.

12. The method of claim 11, wherein the particular mesh node is a moving node.

13. The method of claim 12, wherein the at least one neighbor mesh node is a mesh node to which the particular mesh node can directly move from the serving mesh node, without passing through another mesh node.

14. The method of claim 13, wherein the context information further comprises information on a valid time of the authentication information.

15. The method of claim 14, further comprising if the valid time expires, discarding, by the serving mesh node and the at least one neighbor mesh node, corresponding context information.

16. The method of claim 15, wherein the re-association request message is a handover request message, and the re-association response message is a handover response message.

17. A method for associating with a new mesh node by a particular mesh node among a plurality of mesh nodes in a mesh network, the mesh network comprising the plurality of mesh nodes, the method comprising:
performing initial association with the new mesh node at the request of the new mesh node;
authenticating the new mesh node by performing, by the particular mesh node, an authentication procedure for the new mesh node;
generating context information comprising authentication information of the new mesh Node;
transmitting a neighbor list to the new mesh node for which the initial association is performed; and
delivering the context information to at least one neighbor mesh node determined based on the neighbor list;
wherein information on the at least one neighbor mesh node is written in the neighbor list;
the delivering of the context information is performed after the generating of the context information and before the new mesh requests re-association with any of the at least one neighbor mesh node;
the neighbor list is a neighbor list of the particular mesh node; and
the authentication information of the new mesh node is generated during the authenticating of the new mesh node in the authentication procedure performed by the particular mesh node, and enables the at least one neighbor mesh node to authenticate the new mesh node without performing the authentication procedure performed by the particular mesh node in authenticating the new mesh node.

18. The method of claim 17, wherein the new mesh node is a moving node.

19. The method of claim 18, wherein the at least one neighbor mesh node is a mesh node to which the new mesh node can directly move from the particular mesh node, without passing through another mesh node.

20. The method of claim 19, wherein the context information further comprises information on a valid time of the authentication information.

21. The method of claim 20, further comprising, if the valid time expires, discarding, by the particular mesh node, corresponding context information.

22. The method of claim 17,
wherein the authenticating of the new mesh node is performed by the particular mesh node after the performing of the initial association with the new mesh node and before the generating of the context information; and
the generating of the context information is performed by the particular mesh node after the authenticating of the new mesh node and before the delivering of the context information.

23. A method for associating with a moving mesh node moving from a neighbor mesh node by a particular mesh node among a plurality of mesh nodes in a mesh network, the mesh network comprising the plurality of mesh nodes, the method comprising:
receiving context information for the moving mesh node from the neighbor mesh node based on a neighbor list;
storing the received context information; and
performing association with the moving mesh node using the context information at the request of the moving mesh node;
wherein the neighbor mesh node authenticates the moving mesh node by performing an authentication procedure;
the neighbor mesh node generates the context information after the neighbor mesh node authenticates the moving mesh node and before the receiving of the context information is performed;
the context information comprises authentication information of the moving mesh node;
the receiving of the context information is performed by the particular mesh node after the neighbor mesh node generates the context information and before the moving mesh node requests an association with the particular mesh node;
the neighbor list is a neighbor list of the neighbor mesh node; and
the authentication information of the moving mesh node is generated during the authenticating of the moving mesh node in the authentication procedure performed by the neighbor mesh node, and enables the particular mesh node to authenticate the moving mesh node without performing the authentication procedure performed by the neighbor mesh node in authenticating the moving mesh node.

24. The method of claim 23, wherein the neighbor mesh node is a mesh node to which the moving mesh node can directly move from the particular mesh node, without passing through another mesh node.

25. The method of claim 24, wherein the context information further comprises information on a valid time of the authentication information.

26. The method of claim 25, further comprising, if the valid time expires, discarding, by the particular mesh node, corresponding context information.

27. A mesh network comprising a plurality of mesh nodes, the plurality of mesh nodes comprising:
a moving mesh node; and
a serving mesh node to:
initially associate with the moving mesh node at the request of the moving mesh node;
authenticate the moving mesh node by performing an authentication procedure;
generate context information comprising authentication information of the moving mesh node;
transmit the context information to at least one neighbor mesh node included in a neighbor list; and
transmit information on the at least one neighbor mesh node to the moving mesh node;
wherein the at least one neighbor mesh node:
stores the context information received from the serving mesh node; and
re-associates with the moving mesh node using the context information at the request of the moving mesh node;
the serving node transmits the context information to the at least one neighbor mesh node before the moving mesh node requests re-association with any of the at least one neighbor mesh node;
the neighbor list is a neighbor list of the serving mesh node; and
the authentication information of the moving mesh node is generated during the authenticating of the moving mesh node in the authentication procedure performed by the serving mesh node, and enables the at least one neighbor mesh node to authenticate the moving mesh node without performing the authentication procedure performed by the serving mesh node in authenticating the moving mesh node.

28. The mesh network of claim 27, wherein the at least one neighbor mesh node is a mesh node to which the moving mesh node can directly move from the serving mesh node, without passing through another mesh node.

29. The mesh network of claim 28, wherein the context information further comprises information on a valid time of the authentication information.

30. The mesh network of claim 29, wherein if the valid time expires, the serving mesh node and the at least one neighbor mesh node discard corresponding context information.

31. The mesh network of claim 27, wherein the serving mesh node authenticates the moving mesh node after initially associating with the moving mesh node and before transmitting the context information to the at least one neighbor mesh node; and
the serving mesh node generates the context information including the authentication information after authenticating the moving mesh node and before transmitting the context information to the at least one neighbor mesh node.

* * * * *